(12) United States Patent
Psencik

(10) Patent No.: US 7,427,013 B2
(45) Date of Patent: Sep. 23, 2008

(54) CALCULATOR APPARATUS

(76) Inventor: Nancy L. Psencik, 4102 Buena Vista, #12, Dallas, TX (US) 75204

( * ) Notice: Subject to any disclaimer, the term of this patent is extended or adjusted under 35 U.S.C. 154(b) by 640 days.

(21) Appl. No.: 11/062,402

(22) Filed: Feb. 22, 2005

(65) Prior Publication Data

US 2006/0190382 A1 Aug. 24, 2006

(51) Int. Cl.
  *G01P 11/00* (2006.01)
  *G06G 1/00* (2006.01)
  *G06G 1/14* (2006.01)
  *G06C 29/00* (2006.01)
  *G06C 7/02* (2006.01)
  *G06C 25/00* (2006.01)
  *G06Q 20/00* (2006.01)

(52) U.S. Cl. ............... 235/61 R; 235/59 A; 235/145 R; 705/19

(58) Field of Classification Search ............... 235/61 R, 235/59 R, 59 A, 145 R, 146, 145 A; 705/19, 705/31

See application file for complete search history.

(56) References Cited

U.S. PATENT DOCUMENTS

| | | | |
|---|---|---|---|
| 3,294,960 A | * 12/1966 | Townsend | 235/2 |
| 3,944,801 A | 3/1976 | Montana | 235/156 |
| 4,144,567 A | 3/1979 | Tadakuma et al. | 364/405 |
| 4,458,320 A | * 7/1984 | Sutton | 235/379 |
| 4,485,441 A | 11/1984 | Nakatani et al. | 364/405 |
| 4,814,985 A | 3/1989 | Swistak | 364/405 |
| 5,237,487 A | * 8/1993 | Dittmer et al. | 361/683 |
| 5,799,283 A | 8/1998 | Francisco et al. | 705/19 |
| 5,875,433 A | 2/1999 | Francisco et al. | 705/26 |
| 5,943,247 A | 8/1999 | Kaya et al. | 364/709.12 |
| 6,016,479 A | 1/2000 | Taricani, Jr. | 705/19 |
| 6,078,899 A | 6/2000 | Francisco et al. | 705/19 |
| 6,119,160 A | 9/2000 | Zhang et al. | 709/224 |
| 6,141,650 A | 10/2000 | Iwasa et al. | 705/19 |
| 6,651,882 B2 | 11/2003 | Lane | 235/380 |
| 6,792,457 B1 | 9/2004 | Zhang et al. | 709/224 |

FOREIGN PATENT DOCUMENTS

EP 0 617 388 A2 * 9/1994

* cited by examiner

*Primary Examiner*—Jared J Fureman
(74) *Attorney, Agent, or Firm*—Baker Botts L.L.P.

(57) ABSTRACT

A calculator is provided that includes an input pad that includes a sales tax button and a currency pad, which includes a change due button and a number of currency keys. The currency keys can be depressed in order to enter numeric values associated with currency. The change due button may be used in order to produce a resultant between data provided in the input pad and the currency pad.

13 Claims, 2 Drawing Sheets

CALCULATOR APPARATUS

TECHNICAL FIELD OF THE INVENTION

This invention relates in general to field of computations and, more particularly, to a calculator apparatus.

BACKGROUND OF THE INVENTION

The field of sales has grown exponentially in the past few decades. In particular, a number of cottage industries have sprung up and offer a viable alternative to conventional hourly-based employment. These activities may relate to cosmetic sales, magazine subscription sales, bulk-distribution of food products, or simple farmer's market scenarios, for example.

The lure of these occupations is due to the fact that individuals involved in these businesses can act as their own bosses and set their own schedules. This may be particularly beneficial in the context of today's fast-paced lifestyles. One challenge facing these ambitious individuals is that they often serve in the role of vendor and, accordingly, are required to perform difficult mathematical calculations on the spot. For example, these vendors may be required to make change for customers quickly, particularly in cases where lines exist and a number of customers must be accommodated in a short period of time. Augmenting this difficulty is that these vendors must also account for sales tax in order to be in compliance with state and local tax codes.

SUMMARY OF THE INVENTION

From the foregoing, it may be appreciated by those skilled in the art that a need has arisen for an improved calculator apparatus that provides for an accurate determination of sales that occur outside the normal scope of conventional consumer (in store) transactions. In accordance with one embodiment of the present invention, a calculator apparatus is provided that greatly reduces disadvantages and problems associated with conventional calculation tools.

According to an embodiment of the present invention, there is provided a calculator apparatus that includes an input pad that includes a sales tax button and a currency pad, which includes a change due button and a number of currency keys. The currency keys can be depressed in order to enter numeric values associated with currency. The change due button may be used in order to produce a resultant between data provided in the input pad and the currency pad.

Certain embodiments of the present invention may provide a number of technical advantages. For example, according to one embodiment of the present invention, a calculator apparatus is provided that allows for a given vendor to execute accurate transactions with relative ease. This is due to the configuration of the calculator apparatus, which includes a number of convenient buttons that correlate to common U.S. currency denominations, which could be exchanged between the vendor and the customer. Hence, the vendor can quickly sum several inputs to produce a total, and then input the actual currency received from the buyer in order to provide the correct change to the customer.

Additionally, the present invention offers the advantage of calculating sales tax for the transaction immediately after retrieving a sub-total for the items purchased. From this point, the vendor can then accept money provided by the customer and complete the sale. This stands in contrast to other systems that require a separate percentage calculation in order to determine a resultant sales tax. The calculator apparatus of the present invention can achieve this result quicker and more easily, as compared to other calculating tools.

The present invention is also advantageous because of its size and convenience. No longer would a vendor be required to carry around bulky items that afford the ability (for the vendor) to dispense correct change and to account for sales tax. The present invention provides for a convenient calculating tool that could be carried in a pants pocket or a purse. Additionally, the sales tax input button may be pre-programmed to desired numeric values, which can be based on local and/or state taxes. This would avoid having to input this figure repeatedly during the course of the day by a given vendor, who is experiencing high sales activity.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
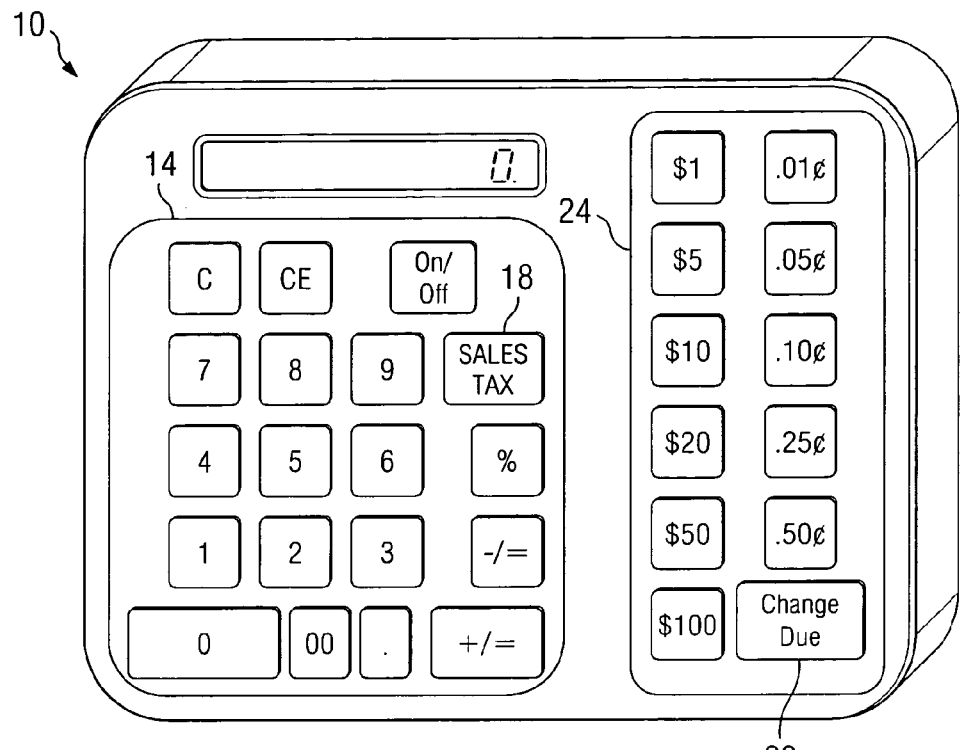
FIG. 1 is a simplified block diagram of a calculator in accordance with one embodiment of the present invention.

FIG. 1 is a simplified block diagram of a calculator 10 for performing mathematical calculations that involve sales. Calculator 10 includes an input pad 14, which includes a number of buttons that can be depressed in order to retrieve a resultant. Within input pad 14 is a sales tax button 18 that is capable of receiving a designated sales tax figure, which can be repeatedly used throughout subsequent transactions. Sales tax button 18 may be, therefore, pre-programmed to account for local and state sales taxes. Sales tax button 18 may include multiple settings such that depressing sales tax button 18 a single time would retrieve the pre-programmed numeric value (most likely the one that is used most often), whereby holding sales tax button 18 for a specified time period would display a different sales tax parameter on the display for the vendor. Hence, sales tax button 18 may be pre-programmed with several common sales tax figures and the vendor may toggle between these as is required. A simple memory component (of any suitable type) could be included in calculator 10 to achieve this storage function.

Calculator 10 also includes a currency input pad 24, which also includes a change due button 20. Currency pad 24, in one example, includes the following currency keys (which correspond to common currency denominations): $1, $5, $10, $20, $50, and $100. Currency input pad 24 also includes a number of currency keys that are less than $1. These include: 1¢, 5¢, 10¢, 25¢, and 50¢ denominations. It is imperative to note that the configuration of currency pad 24 offers just one of the many possibilities for arranging these currency keys. In other embodiments, where a certain currency dominates sales for that particular vendor, these keys could be suitably arranged to accommodate that scenario. For example, if a dominate currency is one dollar bills, then currency pad 24 may include an enlarged key for the one dollar bill entry, whereas the other keys could be eliminated or sized smaller. In a similar fashion, change due button 20 could be sized much larger for purposes of convenience. The specifications of calculator 10 in FIG. 1 offer just one, of a myriad, of potential arrangements and configurations. Accordingly, the present invention should be construed as such, as its broad scope encompasses any such changes or modifications to the system.

In operation of an example embodiment, consider a case where a given vendor sells various small items at a local tradeshow. The majority of these sales are on a cash-basis such that calculator 10 could readily be implemented to ease the computational efforts associated with these transactions. In this scenario, the customer purchases three items, which are valued at $3, $6, and $10. The vendor sees that the customer is about to complete the transaction with cash and so he opts to use calculator 10. With the display at zero, the vendor inputs the three values on the left-hand side of calculator 10 (i.e. input pad 14), which produces a total on the display of 19.00. The vendor then presses sales tax button 18 in order to account for the local state sales tax parameters. In this example, the effective sales tax is 8.25 percent.

The effective sales tax in this transaction has produced a numeric value of 1.57. The vendor may then press the +/= key on input pad 14. The display now shows a result of 20.57. The vendor can then inform the customer of her total and the customer can select the appropriate currency to meet this obligation.

In this example, the customer hands the vendor a ten dollar bill and a twenty dollar bill together. The vendor then inputs these two values using currency pad 24. In particular, the ten dollar key and the twenty dollar key are depressed consecutively and the display now shows 30.00. The vendor may then depress change due button 20, which yields 9.43 on the display. The vendor may then provide back the requisite change to the customer and continue with additional transactions involving other customers.

Hence, the system of the present invention allows for a given vendor to execute accurate transactions with relative ease. This is due to the configuration of the calculator apparatus, which includes a number of convenient buttons that correlate to common U.S. currency denominations that could be exchanged between the vendor and the customer.

The present invention also offers the advantage of computing sales tax for the transaction immediately after retrieving a sub-total. From this point, the vendor can then accept money provided by the customer and complete the sale. Calculator 10 is also advantageous because of its size and convenience. The present invention provides for a convenient calculating tool that could be carried in a pants pocket, an apron or a purse. Moreover, calculator 10 is relatively cheap to manufacture.

Figure 2:
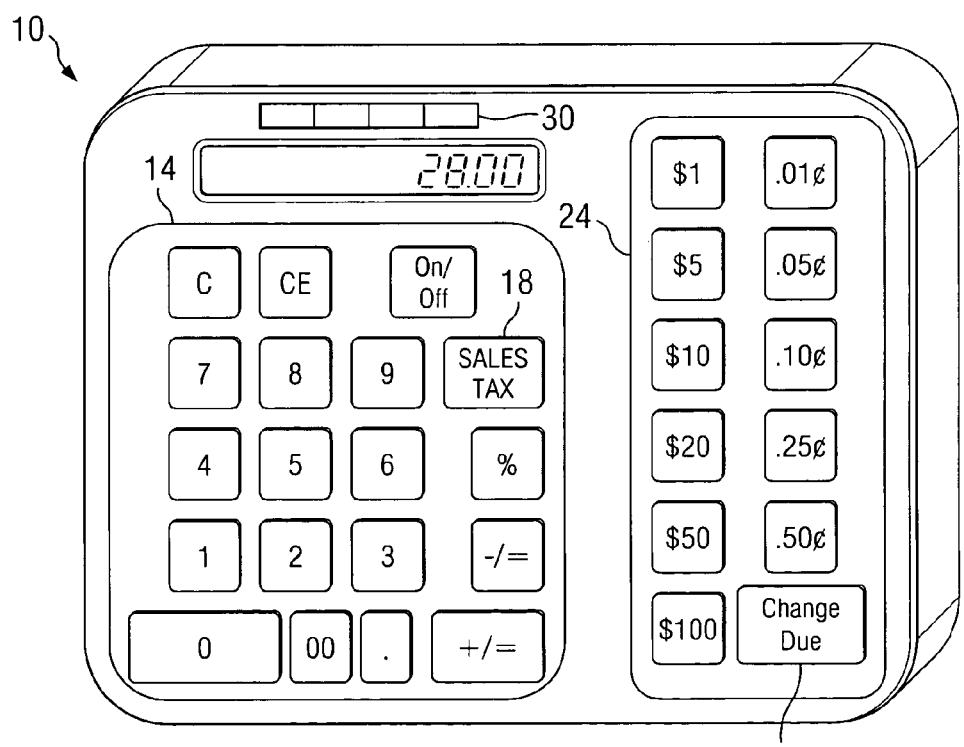
FIG. 2 is a simplified block diagram of the calculator in another embodiment in which a solar panel is provided for the calculator.

Turning to FIG. 2, FIG. 2 illustrates calculator 10 in one example embodiment. Calculator 10 may include a solar panel 30 that is operable to power calculator 10 in its operations. In alternative scenarios, calculator 10 may be powered by battery sources or powered by a conventional electrical outlet (i.e. an AC power supply). Any such configuration choices are clearly within the broad scope of the present invention.

It should also be noted that the present invention could also be embodied in software, such that the teachings, as highlighted herein, can be achieved using a laptop computer, personal digital assistant (PDA), a cellular telephone, a watch, a personal computer, or any other device component, element, or object that can process this information identified herein. A disk, a USB cable, a CD, or any other suitable component, could be used to load the software into the device. Considerable flexibility is provided in all such applications. Although potentially more cumbersome, usage of laptops or home computers to produce the same resultants may be preferred in cases where such a setup involves minimal effort on the part of the vendor.

Figure 3:
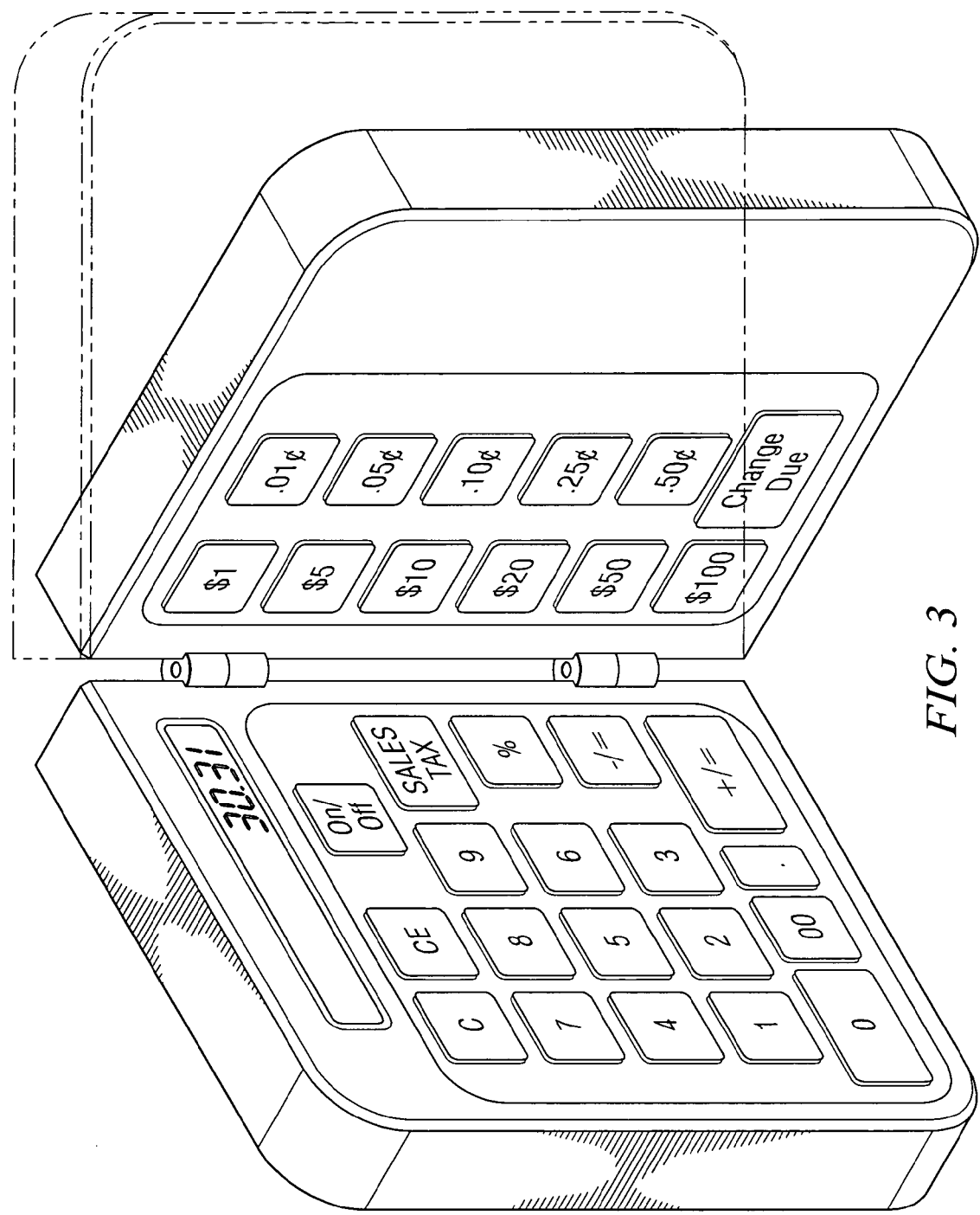
FIG. 3 is a simplified block diagram of the calculator in accordance with another embodiment of the present invention.

FIG. 3 is simplified block diagram of another example embodiment of calculator 10. In the example of FIG. 3, calculator 10 has been divided into two sections, where a hinge has been provided therebetween. The hinge facilitates movement for the two divisions of calculator 10. This would allow calculator 10 to be closed like a wallet or a book. This could protect all of the buttons and/or keys of calculator 10 and, further, provide for a compact solution for any given vendor.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of filing hereof unless the words "means for" are specifically used in the particular claims; and (b) does not intend by any statement in the specification to limit his invention in any way that is not otherwise reflected in the appended claims.

What is claimed is:

1. A calculator, comprising:
an input pad that includes a sales tax button; and
a currency pad, which includes a change due button and a number of currency keys, wherein the currency keys can be depressed in order to enter numeric values associated with currency, and wherein the change due button may be used in order to produce a resultant between data provided in the input pad and the currency pad, wherein the calculator is handheld, and wherein the sales tax button is electronically coupled to a memory within the calculator such that the calculator may be pre-programmed to include two or more numeric values associated with sales tax, wherein when an individual depresses the sales tax button for a prescribed period of time, the pre-programmed numeric values change on a display of the calculator and the displayed numeric value acts as a tax standard for a given calculation, and wherein the calculator includes a solar panel that is operable to power the calculator.

2. The calculator of claim 1, wherein the currency pad includes a selected one or more of the following currency denominations:
a) $1;
b) $5;
c) $10;
d) $20;
e) $50; and
f) $100.

3. The calculator of claim 1, wherein the currency pad includes one or more of the following currency denominations:
a) 1¢;
b) 5¢;
c) 10¢;
d) 25¢; and
e) 50¢.

4. The calculator of claim 1, wherein the calculator is divided into a first portion and a second portion, and wherein a hinge is provided between the first portion and the second portion such that the hinge facilitates movement of the first portion with respect to the second portion.

5. Software embodied in a computer readable medium and comprising computer code such that when executed is operable to provide a graphical representation that substantially illustrates:

an input pad that includes a sales tax button; and a currency pad, which includes a change due button and a number of currency keys, wherein the currency keys can be depressed in order to enter numeric values associated with currency, and wherein the change due button may be used in order to produce a resultant between data provided in the input pad and the currency pad, and wherein the sales tax button is electronically coupled to a memory within a calculator such that the calculator may be pre-programmed to include two or more numeric values associated with sales tax, wherein when an individual depresses the sales tax button for a prescribed period of time, the pre-programmed numeric values change on a display of the calculator and the displayed numeric value acts as a tax standard for a given calculation.

6. The medium of claim 5, wherein the currency pad includes a selected one or more of the following currency denominations:
 a) $1;
 b) $5;
 c) $10;
 d) $20;
 e) $50; and
 f) $100.

7. The medium of claim 5, wherein the currency pad includes one or more of the following currency denominations:
 a) 1¢;
 b) 5¢;
 c) 10¢;
 d) 25¢; and
 e) 50¢.

8. The medium of claim 5, wherein the software is provided in a selected one of a group of devices, the group consisting of:
 a) a laptop computer;
 b) a personal digital assistant (PDA);
 c) a cellular telephone;
 d) a watch; and
 e) a personal computer.

9. A calculator, comprising:

an input pad that includes a sales tax button;

a currency pad, which includes a change due button and a number of currency keys, wherein the currency keys can be depressed in order to enter numeric values associated with currency, and wherein the change due button may be used in order to produce a resultant between data provided in the input pad and the currency pad wherein the calculator is handheld, and wherein the sales tax button is electronically coupled to a memory within the calculator such that the calculator may be pre-programmed to include two or more numeric values associated with sales tax, wherein when an individual depresses the sales tax button for a prescribed period of time, the pre-programmed numeric values change on a display of the calculator and the displayed numeric value acts as a tax standard for a given calculation, the currency pad including a selected one or more of the following currency denominations:
 a) $1;
 b) $5;
 c) $10;
 d) $20;
 e) $50;
 f) $100
 g) 1¢;
 h) 5¢;
 i) 10¢;
 j) 25¢; and
 k) 50¢.

10. The calculator of claim 9, wherein the calculator is divided into a first portion and a second portion, and wherein a hinge is provided between the first portion and the second portion such that the hinge facilitates movement of the first portion with respect to the second portion.

11. The calculator of claim 9, wherein the calculator is powered by one or more batteries.

12. The calculator of claim 9, wherein the calculator is powered by an AC power source.

13. The calculator of claim 9, wherein the calculator includes a display that is operable to show the resultant.

* * * * *